United States Patent Office 3,543,481
Patented Dec. 1, 1970

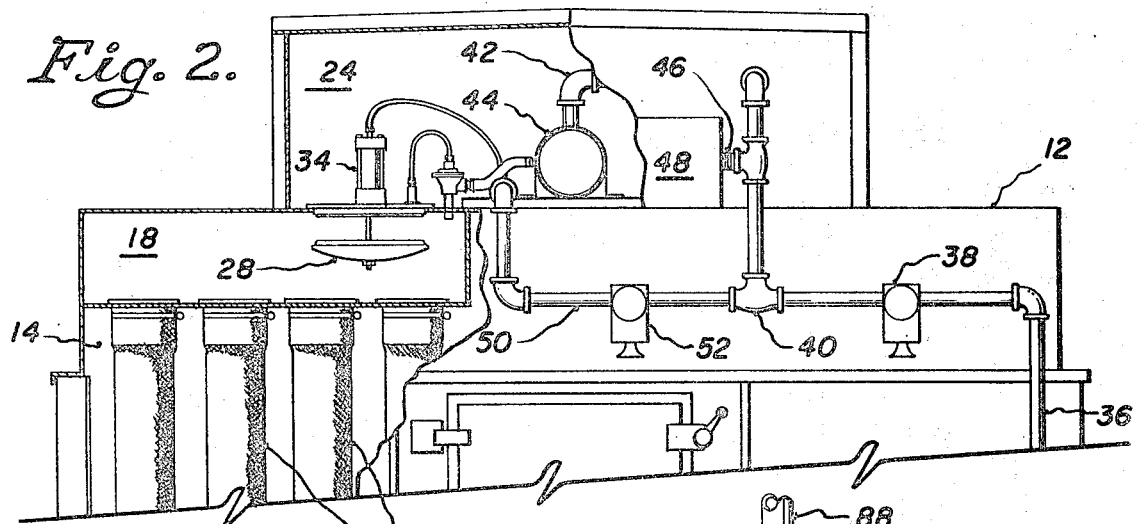
Fig. 2.
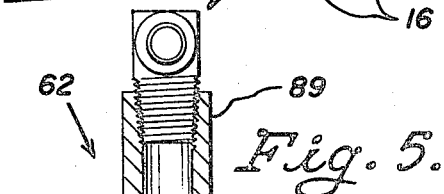
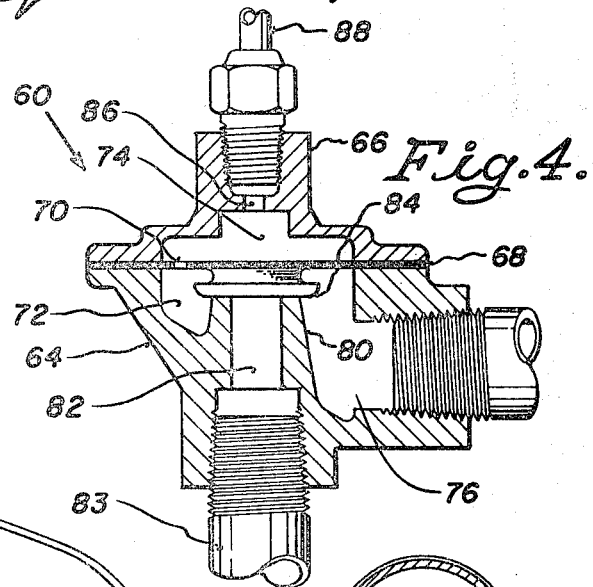
Fig. 5.
Fig. 4.
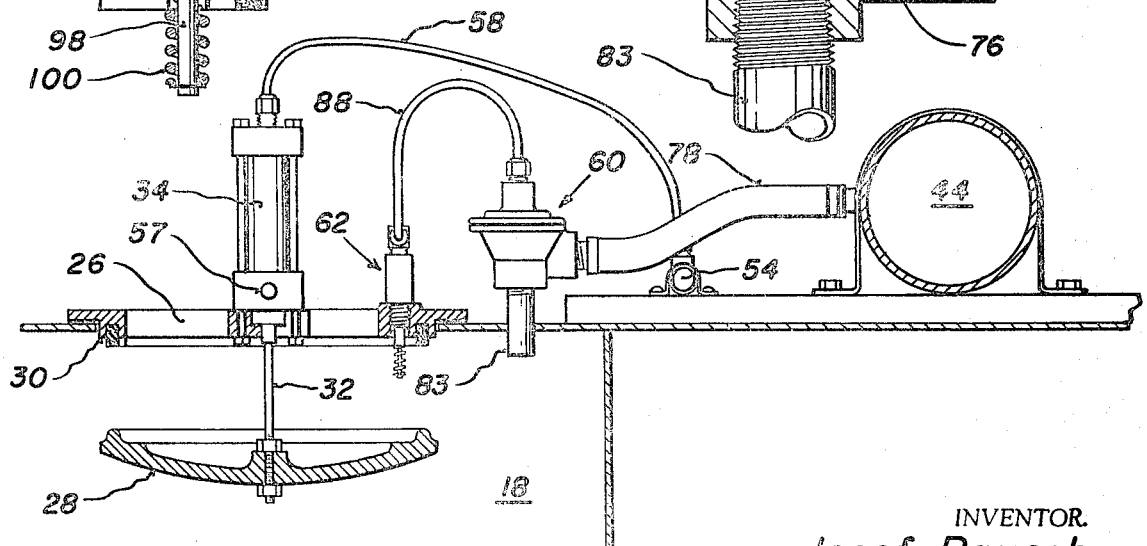
Fig. 3.
INVENTOR.
Josef Pausch
BY
Whiteley and Caine
ATTORNEYS

3,543,481
HIGH PRESSURE CLEANING OF DUST SEPARATING APPARATUS
Josef Pausch, Hopkins, Minn., assignor to Aerodyne Machinery Corporation, Hopkins, Minn.
Filed Aug. 3, 1967, Ser. No. 658,109
Int. Cl. B01d 46/04
U.S. Cl. 55—96      3 Claims

ABSTRACT OF THE DISCLOSURE

A method and apparatus for dislodging dust from a porous filtering surface, embodying the use of high pressure gas emitted from a reservoir in such a manner as to impart a high pressure shock to one or more porous filtering surfaces to dislodge heavily compacted solids therefrom.

---

This invention relates to improvements in the separation of dust from a dust-gas mixture. In general, the invention is concerned with discharging the accumulated solids from the porous material that serves as the filtering media. More particularly, the invention is concerned with a method and means of removing accumulated solids from the porous material forming one or more filtering surfaces by the use of gas under a relatively high pressure, and in sufficient volume to a confined space on one side of the filtering elements so as to almost instantaneously remove the accumulated solids therefrom.

In the prior art dealing with the filtration of dust or similar solids from a mixture containing gas or air, the accumulated solids have been discharged from the porous material either by vibrating the filtering elements, or by reverse flow, "backwashing" the elements with relatively clean gas, or by combination of those procedures. It is preferred to utilize the "backwashing" principle, and a recent development of such a system is disclosed in my copending application Ser. No. 474,101 now Pat. No. 3,436,899, in which compressed air is accelerated to supersonic speed and then discharged against a portion of the porous surface to dislodge the solids or dust accumulated thereon. However, these prior art systems or methods, while working satisfactorily in some situations, become inefficient when the dust loading is very heavy, because the prior systems did not provide enough pressure and volume of air to properly discharge heavily compacted dust or solid materials.

In the present invention, I have provided a system comprising methods and apparatus which are applicable to properly discharge the accumulated solids from the porous surface on which said solids have been collected by the economical application of air compressed to a relatively high pressure and in sufficient volume to produce a substantial shock throughout the entire area of the clean air portions of all of the porous elements and thus instantly discharge the accumulated dust.

An object of the invention is to provide a system for separating high concentrations of dust or other solids from gas or air, and for properly discharging the accumulated solids from the filtering media.

A further object is to provide a system by which a porous filtering surface can be cleansed of accumulated solids by the use of air under relatively high compression and in sufficient volume to properly discharge a relatively heavy layer of accumulated solids.

Other and further objects and advantages of the invention may become apparent from the following specification and claims, and in the appended drawings in which:

FIG. 2 is a side elevation of a portion of the structure shown in FIG. 1, with parts broken away to show interior structure;

FIG. 3 is a side elevation of a portion of the structure shown in FIG. 2;

FIG. 4 is a sectional enlargement of a control element shown in FIG. 3; and

FIG. 5 is an enlargement of another control element disclosed in FIG. 3.

Figure 1:
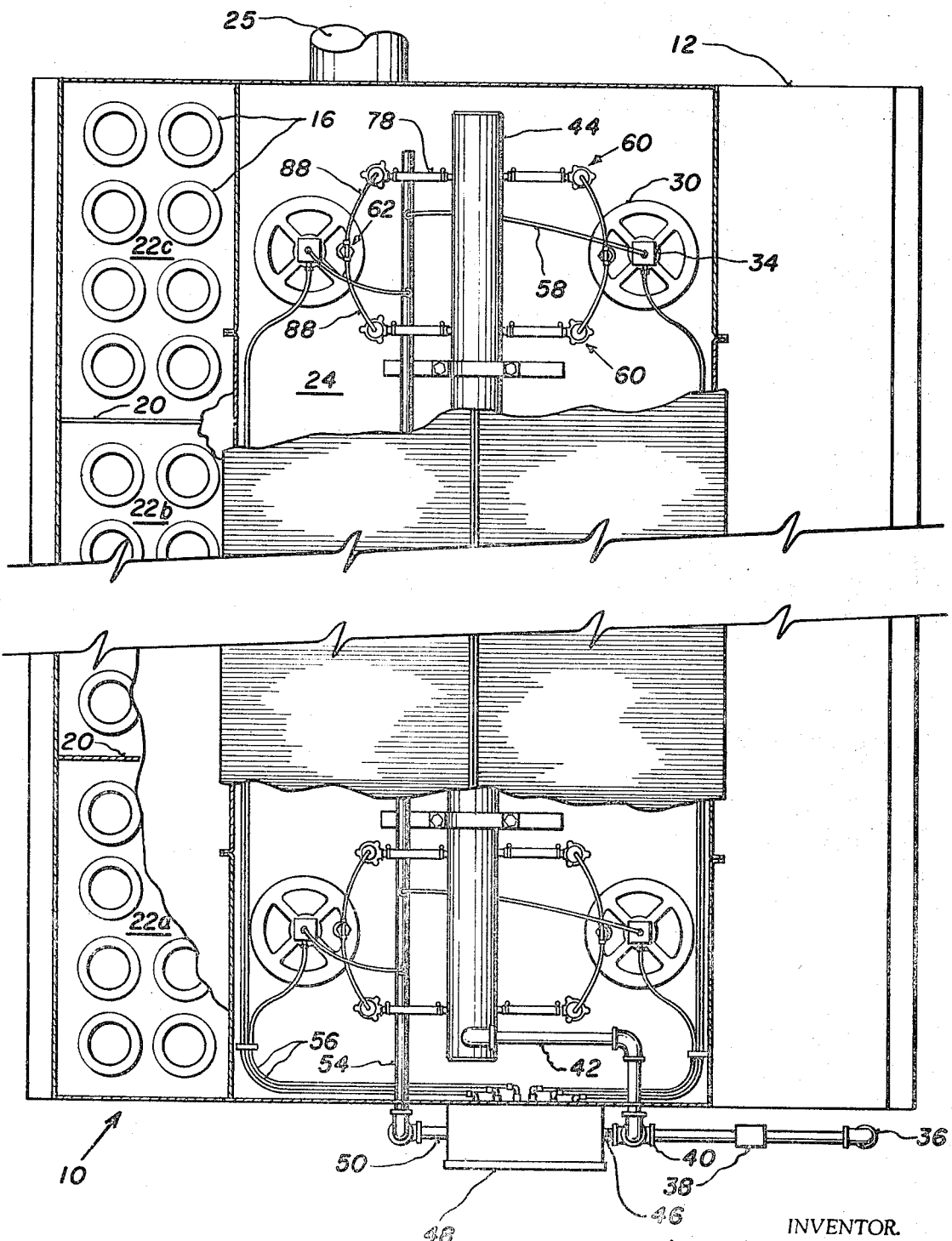
FIG. 1 is a plan view with parts broken away showing a portion of a system for filtering dust or other solids from air or other gases, and which embodies the present invention.

Referring now to the several figures of the drawings, the invention will be described in detail. General reference numeral 10 indicates in its entirety a system for filtering dust from a dust-air mixture and would find particular utility in a situation where there might be a relatively high proportion of dust to air, or at least a situation where there is a relatively large amount of dust that must be collected and separated. The apparatus includes a general casing indicated by the reference character 12, and composed of a lower portion 14 which receives a dust-air mixture. The mixture is admitted to portion 14 through a duct or opening not shown. Within the interior of portion 14 is a multiplicity of porous filtering elements, designated severally by reference numeral 16, which are each composed of wire frame around which is a cloth or fabric bag. These elements 16 have their outer surface exposed to the atmosphere within the interior of casing portion 14, and their interior surfaces in communication with an intermediate clean air plenum designated at 18. The intermediate plenum 18 is divided by upright partition portions 20 into a series of individual chambers designated as 22a, 22b and 22c. The general structure 12 may contain a multiplicity of these individual chambers arranged in two rows, but for simplicity of disclosure, one row has been omitted from the right-hand side of the disclosure of FIG. 1 and FIG. 2, since these parts would be a mere duplication of those already shown. Situated above the intermediate plenum 18 is a housing forming a second clean air plenum designated by reference character 24. The clean air plenum 24 is shown with a duct 25 which extends to a fan or blower, not shown, which when operative will draw clean air from plenum 24 and discharge the same to atmosphere.

Between each of the several intermediate chambers 22a, 22b, 22c, and the upper clean air plenum, is a large opening designated by reference character 26 that forms a passage for the clean air. Each of these passages or openings 26 is rendered closeable by a large valve member 28. The valve member 28 is connected to a rod 32 that forms a part of a pneumatic motor 34, that is actuated in opposite directions by compressed air.

The volume to which dust-laden air or gas is restricted, including the inner walls of casing 12 and the outer surfaces of filtering elements 16, may be referred to as a receiving gas zone, or chamber. The volumes, including portions 22a, 22b, and 22c, severally of plenum 18, plus the insides of the filtering elements 16 associated therewith may be referred to as clean gas zones; as shown in the drawing, each clean gas zone may have more than one filtering element associated with it. Plenum 24 and duct 25 may be referred to as a gas discharge zone or area. Each passage 26 connects a clean gas zone with the discharge area.

As best seen in FIGS. 1 and 2, a pipe or conduit 36 extends from a source of compressed air, such as a mechanical compressor, and contains a pressure regulator 38 whose function in this instance is to regulate the pressure of compressed air being delivered by conduit 36 to a maximum pressure of substantially 100 p.s.i. A T 40 forms a connection for a branch conduit 42 that extends to a large cylinder 44 which serves as a reservoir of compressed air that is used for dislodging the accumulated dust or other materials from the outer surfaces of the numerous porous filtering elements 16 as will be described later. A short branch 46 of the high pressure conduit 36 also extends to a timer mechanism 48, seen in FIG. 1, which functions to operate the several motors 34 of the several valves 28. From the T 40, a second branch conduit 50 is shown containing a pressure regulator 52 which functions to regulate the pressure of air in a conduit 54 to a pressure between 20–30 p.s.i. Such air is utilized for one phase of operation of the several motors 34 associated with the several valves 28.

As seen in FIG. 1, the timer 48 has extended therefrom a multiplicity of small conduits which are collectively designated by the reference character 56, each of which extends to a lower opening 57 of the pneumatic motors 34. The compressed air of higher pressure controlled by the timer 48, and which is delivered by the conduits 56, serves the function of driving the enclosed piston in an upward direction so as to close the respective valve 28 relative to its associated flange 30. Each of the conduits 56 within the timer mechanism 48 is connected to an individual electrically controlled solenoid valve, not shown, which when actuated by the timing mechanism permits high pressure air to flow through a selected conduit 56 to actuate a selected motor 34. From the top of each of the motors 34 is a conduit 58 that extends to the low pressure conduit 54 to allow the low pressure air to enter the motor 34 and drive the piston downwardly to open valve 28 when the mechanism in the timer 48 cuts off the flow of high pressure air to each of the conduits 56.

Referring now to FIGS. 3, 4 and 5, are shown a pair of control devices that are indicated by general reference numerals 60 and 62 that control the flow of high pressure air from the large reservoir 44 to each of the several plenum chambers 22a, 22b, and 22c when the respective valves 28 for each of those chambers is in a closed position. Referring first to FIG. 4, the control device 60, of which there are two for each plenum section, is composed of a lower portion 64, and upper portion 66 that are separated from each other by a flexible diaphragm 68, which diaphragm contains a small bleed hole or passage 70 that forms communication between a chamber 72 in the lower portion 64, and a chamber 74 in the upper portion 66. A threaded opening 76 in the lower portion 64 is adapted to receive a connecting member of a flexible conduit 78 which extends from the reservoir 44, so that high pressure air may enter the chamber 72. Within its interior, the chamber 72 contains a tubular member 80 that communicates with a passage 82 that contains a conduit 83 which extends into the lower plenum chamber 18, as clearly seen in FIG. 3. A metallic disc 84 is seated upon the upper end of the tubular member 80, and said disc is also held by the lower surface of the flexible diaphragm 68. The area beneath the diaphragm 68, in surrounding relation to the plug 84, is about ½ of the area of the diaphragm in the chamber 74, so that the arrangement of said diaphragm and the plug constitute a differential pressure mechanism to control the passage of air from chamber 72 through passage 82. The upper part 66 of member 60 contains a passage 86, which is connected to a flexible conduit 88 that extends to the upper open end of the control device 62, disclosed in detail in FIG. 5.

Referring to FIG. 5, the control device 62 is composed of a tubular body member 89 which is threaded at its upper end to receive a connecting member secured to the conduit 88. The member 89 contains a large passage 90 which contains a pocket-like portion 92 of smaller diameter, from which there extends a bleed hole or passage 94. A piston-like member 96 is disposed within the passage 90, and has a shank portion 98 that depends from the body member 89 and is surrounded by a coil spring 100.

The operation of the invention will now be explained. The structure 12 disclosed in this application may vary considerably in size, but in general, it is used in a location where a considerable amount of dust or other solids are formed and must be separated from a relatively large volume of air. The dust-laden air must be admitted into the lower chamber 14 of the housing 12, and in general, this is accomplished by a means of one or more blowers or fans having their low pressure side associated with the outlet pipe 25 extending from the clean air plenum 24 so as to draw the dust-laden air into chamber 14, filtering the solids therefrom on the outer surfaces of the multiplicity of porous filter tubes 16 and with the clean air entering the plenum 18 and passing through the several valve openings 26 into the upper plenum chamber 24 from where it is exhausted. In a typical example of an actual structure, I have provided 12 valves of the type disclosed, and in general, all of these valves will be in an open position so that all of the several separated chambers, of which three are designated as 22a, 22b and 22c, etc., are in full communication with the clean air plenum 24. The timer mechanism 48 is so adjusted as to actuate each of the several valves 28 in a proper sequence. It is necessary that the reservoir 44 contains its charge of air at maximum pressure and since this pressure is discharged in an explosive-like manner in each of the several separated chambers in a sequential arrangement, the timing mechanism is so arranged that the reservoir 44 has its supply completely replenished between operations of the various valve members. When the timer mechanism determines that one of the valves is to be closed, a charge of high pressure air is emitted through one of the conduits 56 to the lower opening 57 of one of the pneumatic motors 34 driving the enclosed piston upwardly to move the valve 28 to a closed position with respect to its cooperating flange 30. Prior to this occurrence, the related conduits 78 have permitted high pressure air from the reservoir 44 to flow into the chambers 72 of the two members 60, and by means of the bleeder passages 70, such air passes through the diaphragm from chambers 72 to the chambers 74, and thence through the passages 86 and conduits 88 to member 62. With respect to the member 62, as shown in FIG. 3, the piston or plunger 96 is held in its extended position by the coil spring 100, and hence the bleed passage 94 is sealed by the upper end 96 of the plunger. When the valve member 28 is moved to its closed position by the pneumatic member 34, the outer end of plunger 98 is engaged by a portion of the valve body 28 moving the plunger upwardly against the bias of spring 100 to allow the compressed air to flow about the head portion 96 and out of the bleed passage 94. The flow capacity of the bleed passage 94 is much larger than that of the bleeder passage 70 in the diaphragm 68, and hence the differential arrangement on opposite sides of the diaphragm 68 cause the diaphragm to be arched upwardly, thereby lifting the plug 84 from the passage 80 so as to permit the high pressure air from reservoir 44 to flow through conduits 78 into the chambers 72 and thence out the passages 82 into one of the plenum chambers 22a, 22b or 22c, etc., and thence into the interior of the several porous filtering elements 16 that are in communication with the selected plenum chambers. The air pressure within the reservoir 44 will rapidly expend itself through the pair of members 60 in the nature or character of an explosive-like expansion of air which discharges the accumulated dust or other solids from the outer surfaces of the several tubes 16. The capacity of the reservoir 44 substantially exceeds the internal area of a single plenum chamber and its associated filtering tubes, and therefore, if there is a heavy build-up of dust or other solids on the outer surfaces of the group of tubes, this accumulated material will be substantially instantly confronted with very high pressure from the air emitted from reservoir 44, so that the mechanism operates more efficiently under conditions where the accumulated solids on the outer surfaces of the group of tubes 16 is relatively thick, for in that manner the full pressure of reservoir 44 is exerted against all of the accumulated solids, and is therefore more efficient than if the accumulated solids formed a very thin layer. Normally, the timing arrangement for each individual plenum and its associated tubes is approximately one-tenth of a second, and this short time is found to be very efficient in discharging heavy dust layers. The dislodged dust or other solids are then removed from the lower portion of chamber 14 by conventional means.

The system is, to a degree, subject to regulation. I have described the maximum air pressure in the inlet conduit 36 as being approximately 100 p.s.i., but this pressure may be reduced if there is only a light loading of dust, and therefore, a limited differential in pressure on the opposite sides of the filter elements 16. Automatic control may be provided which will respond to changes in differential pressure.

In the prior art, it has been customary to limit the ratio of the area of the filtering surface to the volume of air which is handled. This ratio may vary between 3–15 cubic feet of air handled per minute per square foot of filter surface. However, because I am able to rapidly and efficiently discharge dust or other solids from the outer surfaces of the filter elements by the high pressure arrangement provided in this disclosure, it is possible to increase the ratio of air to filtering surface to as much as 20–40 cubic feet of air per minute per square foot of filter surface. It follows, therefore, that with the present invention larger volumes of air can be handled at a lower cost, and the larger volume of dust or other solids within the entrained air can be handled at a lower cost, making the system much more efficient than was heretofore possible.

The invention is defined in the terms of the appended claims.

I claim:

1. A method of removing accumulated solids from one surface of a porous filtering element in which said surface is exposed to a dust bearing gas in a receiving gas zone and the other surface is exposed to a clean gas zone, and in which gas normally flows from said receiving gas zone through said element into said clean gas zone, and from said clean gas zone through a valve controlled passage into a discharge area, comprising the steps of:

closing communication from said clean gas zone into said discharge area by the closing of said valve relative to said passage;

providing a supply of gas under a pressure of several atmospheres, said supply and the pressure thereof defining a quantity of gas which at normal pressure would occupy a volume greater than the volume of said clean gas zone;

explosively discharging said supply of gas into said clean gas zone by a discharge of relatively short duration, said supply of gas being sufficiently great and said duration of discharge being sufficiently brief that the pressure of gas within said clean gas zone is sharply and uniformly raised to a level substantially in excess of the pressure existing within said receiving gas zone, thereby causing said accumulated solids to be abruptly discharged from said one surface of said porous filtering element;

and then reopening communication extending through said passage from said clean gas zone when the pressure in said zone has returned substantially to the pressure existing in said clean gas zone prior to the discharge of said supply of gas therein.

2. In apparatus for filtering dust-laden gas, embodying a dust-laden gas receiving chamber, a gas discharge area, a clean gas zone disposed between said dust-laden gas receiving chamber and said discharge area, a porous filtering element disposed between said dust-laden gas receiving chamber and said clean gas zone, and passage means extending between said clean gas zone and said discharge area;

the improvement of means for removing accumulated dust from said porous filtering element, comprising;

a supply of high energy gas including a reservoir and means continuously supplying gas to said reservoir at a first rate so as to increase the pressure in said reservoir to a high value;

first valve means associated with said passage for closing the same when operated;

second valve means disposed between said supply and said clean gas zone and which when operated explosively discharges said high energy gas from said reservoir into said clean gas zone at a second rate which quickly reduces the pressure in said reservoir to a low value, the capacity of said reservoir and the high value of pressure of the gas therein defining a quantity of gas which at normal pressure would occupy a volume greater than the volume of said clean gas zone;

and control means operatively associated with at least one of said valve means to first cause and then interrupt operation of said second valve means, for controlling the flow of said high energy gas into said clean gas zone.

3. In apparatus for filtering dust-laden gas, embodying a dust-laden gas receiving chamber, a gas discharge area, a clean gas zone disposed between said dust-laden gas receiving chamber and said discharge area, a porous filtering element disposed between said dust-laden gas receiving chamber and said clean gas zone, and passage means extending between said clean gas zone and said discharge area;

the improvement of means for removing accumulated dust from said porous filtering element, comprising;

a supply of high energy gas including a reservoir and means continuously supplying gas to said reservoir at a first rate so as to increase the pressure in said reservoir to a high value;

first valve means associated with said passage for closing the same when operated;

second valve means disposed between said supply and said clean gas zone and which when opened explosively discharges said high energy gas from said reservoir into said clean gas zone at a second rate which quickly reduces the pressures in said reservoir to a low value, the capacity of said reservoir and the high value of pressure of the gas therein defining a quantity of gas which at normal pressure would occupy a volume greater than the volume of said clean gas zone;

first control means for initiating a cleaning cycle by operating said first valve means;

and second control means actuated by operation of said first valve means for thereafter opening said second valve means to cause the discharge of said high energy gas, the quantity of gas thus discharged being sufficient to occupy, at the pressure prevailing in said clean gas zone, a volume greater than that of said zone, whereby to substantially raise the pressure therein when said first valve means is in a closed position with respect to said passage.

References Cited

UNITED STATES PATENTS

| | | | |
|---|---|---|---|
| 1,784,339 | 12/1930 | Clasen et al. | 55—302 |
| 2,526,651 | 10/1950 | Garbo | 55—303 |
| 3,078,646 | 2/1963 | Leech et al. | 55—303 |
| 3,097,938 | 7/1963 | Weller | 55—302 |
| 3,368,328 | 2/1968 | Reinauer | 55—302 |
| 3,394,532 | 7/1968 | Oetiker | 55—302 |
| 3,390,512 | 7/1968 | Hanes | 55—302 |

DENNIS E. TALBERT, Jr., Primary Examiner

U.S. Cl. X.R.

55—273, 283, 288, 293, 302, 341